(12) United States Patent
Venugopal et al.

(10) Patent No.: US 12,252,263 B2
(45) Date of Patent: Mar. 18, 2025

(54) WEAR RESISTANT SLEEVE FOR COMPOSITE CYLINDER

(71) Applicant: Hamilton Sundstrand Corporation, Charlotte, NC (US)

(72) Inventors: Sanjay Venugopal, Karnataka (IN); Amit Kumar Tripathi, Uttar Pradesh (IN); Rajiv Krishnappa, Bangalore (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 36 days.

(21) Appl. No.: 18/299,158

(22) Filed: Apr. 12, 2023

(65) Prior Publication Data
US 2024/0190575 A1    Jun. 13, 2024

(30) Foreign Application Priority Data
Dec. 12, 2022   (IN) ............................. 202211071676

(51) Int. Cl.
*B64D 29/08* (2006.01)
(52) U.S. Cl.
CPC ................................. *B64D 29/08* (2013.01)
(58) Field of Classification Search
CPC ............................... B64D 29/00; B64D 29/08
See application file for complete search history.

(56) References Cited

U.S. PATENT DOCUMENTS

| | | | | |
|---|---|---|---|---|
| 3,739,435 A * | 6/1973 | Baker | ...................... | F16B 2/185 248/74.1 |
| 4,135,743 A | 1/1979 | Hughes | | |
| 6,688,339 B2 | 2/2004 | Yamaguchi et al. | | |
| 7,563,496 B2 * | 7/2009 | Watson | .................... | B32B 15/18 405/211.1 |
| 2013/0175419 A1 * | 7/2013 | Wheeler | ................. | E05C 17/02 248/354.1 |
| 2018/0057183 A1 * | 3/2018 | Le Cadet | ................ | B64C 27/06 |
| 2018/0223572 A1 * | 8/2018 | Artin | ....................... | E05C 17/08 |
| 2019/0048629 A1 * | 2/2019 | Dyer | ..................... | B64C 1/1461 |

FOREIGN PATENT DOCUMENTS

| | | |
|---|---|---|
| CN | 103448257 A | 12/2013 |
| EP | 0172039 A2 | 2/1986 |
| GB | 2076489 A | 12/1981 |

OTHER PUBLICATIONS

European Search Report for European Application No. 23211185.6; dated Mar. 21, 2024; 7 pages.

* cited by examiner

*Primary Examiner* — Tye William Abell
(74) *Attorney, Agent, or Firm* — CANTOR COLBURN LLP

(57) ABSTRACT

A rod assembly includes a tubular rod body formed from a composite material and a localized sleeve installed to the rod body. The sleeve is secured to the rod body by application of heat to the sleeve material. A bushing is located radially between the rod body and the sleeve. The bushing is configured to absorb thermal energy of the application of heat. A door and hold open rod assembly of an aircraft includes a door, and a hold open rod assembly secured to the door. The hold open rod assembly is configured to support the door in an opened position when the hold open rod is deployed. The hold open rod assembly includes a tubular rod body formed from a composite material, and a localized sleeve installed to the rod body. A bushing is located radially between the rod body and the sleeve.

19 Claims, 3 Drawing Sheets

WEAR RESISTANT SLEEVE FOR COMPOSITE CYLINDER

CROSS REFERENCE TO RELATED APPLICATIONS

This application claims the benefit of India Provisional Application No. 202211071676 filed Dec. 12, 2022, the disclosure of which is incorporated herein by reference in its entirety.

BACKGROUND

Exemplary embodiments pertain to the art of composite cylinders, and more particularly to cowling hold open rods for aircraft.

On typical aircraft, the engines are mounted either under the wing or on the fuselage. The engines are enclosed in cowling to direct airflow along the engine flowpath and to also contain engine components therein. During engine maintenance operations, it may be necessary to access the engine inside the cowling. As such, the cowling components are often hinge mounted and are rotatable to an opened position to allow such engine access for the maintenance personnel. The cowling may utilize a hold open rod which is deployable to the engine to hold the cowling in the opened position. When not being utilized, the hold open rod is typically secured in place inside of the cowling, often utilizing a spring clip or similar device. During operation of the aircraft when the hold open rod is in the stowed position, the hold open rod is subject to vibration in the spring clip, which results in wear of the hold open rod at this location.

BRIEF DESCRIPTION

In one embodiment, a rod assembly includes a tubular rod body formed from a composite material and a localized sleeve installed to the rod body. The sleeve is secured to the rod body by application of heat to the sleeve material. A bushing is located radially between the rod body and the sleeve. The bushing is configured to absorb thermal energy of the application of heat.

Additionally or alternatively, in this or other embodiments a body notch is formed in the rod body in which the bushing is positioned.

Additionally or alternatively, in this or other embodiments a bushing lip is formed in the bushing to position the sleeve material relative to the bushing.

Additionally or alternatively, in this or other embodiments a bushing split is formed in the bushing to allow for installation of the bushing to the rod body.

Additionally or alternatively, in this or other embodiments the sleeve is formed from a polyolefin material.

Additionally or alternatively, in this or other embodiments the bushing is formed from a polyetheretherketone (PEEK) material.

In another embodiment, a door and hold open rod assembly of an aircraft includes a door, and a hold open rod assembly secured to the door. The hold open rod assembly is configured to support the door in an opened position when the hold open rod is deployed. The hold open rod assembly includes a tubular rod body formed from a composite material, and a localized sleeve installed to the rod body. The sleeve is secured to the rod body by application of heat to the sleeve material. A bushing is located radially between the rod body and the sleeve. The bushing is configured to absorb thermal energy of the application of heat.

Additionally or alternatively, in this or other embodiments a spring clip is secured to the door to retain the hold open rod in a stowed position, the spring clip configured to retain the hold open rod at the localized sleeve.

Additionally or alternatively, in this or other embodiments a rod hinge retains the hold open rod to the door.

Additionally or alternatively, in this or other embodiments a body notch is formed in the rod body in which the bushing is positioned.

Additionally or alternatively, in this or other embodiments a bushing lip is formed in the bushing to position the sleeve material relative to the bushing.

Additionally or alternatively, in this or other embodiments a bushing split is formed in the bushing to allow for installation of the bushing to the rod body.

Additionally or alternatively, in this or other embodiments the sleeve is formed from a polyolefin material.

Additionally or alternatively, in this or other embodiments the bushing is formed from a polyetheretherketone (PEEK) material.

Additionally or alternatively, in this or other embodiments the door is a cowling of an engine assembly for an aircraft.

In yet another embodiment, an engine assembly of an aircraft includes an engine body, and a cowling configured to at least partially enclose the engine body. The cowling is movable between a closed position and an opened position. A hold open rod assembly is secured to the cowling. The hold open rod assembly is configured to support the cowling in an opened position when the hold open rod is deployed. The hold open rod assembly includes a tubular rod body formed from a composite material, and a localized sleeve installed to the rod body. The sleeve is secured to the rod body by application of heat to the sleeve material. A bushing is located radially between the rod body and the sleeve. The bushing is configured to absorb thermal energy of the application of heat.

Additionally or alternatively, in this or other embodiments a spring clip is secured to the cowling to retain the hold open rod in a stowed position. The spring clip is configured to retain the hold open rod at the localized sleeve.

Additionally or alternatively, in this or other embodiments a body notch is formed in the rod body in which the bushing is positioned.

Additionally or alternatively, in this or other embodiments a bushing lip is formed in the bushing to position the sleeve material relative to the bushing.

Additionally or alternatively, in this or other embodiments a bushing split is formed in the bushing to allow for installation of the bushing to the rod body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. The present disclosure is described in the context of a hold open rod of a cowling for an aircraft engine, but one skilled in the art will readily appreciate that the present disclosure may be readily applied to other rod and retention applications.

Figure 1:
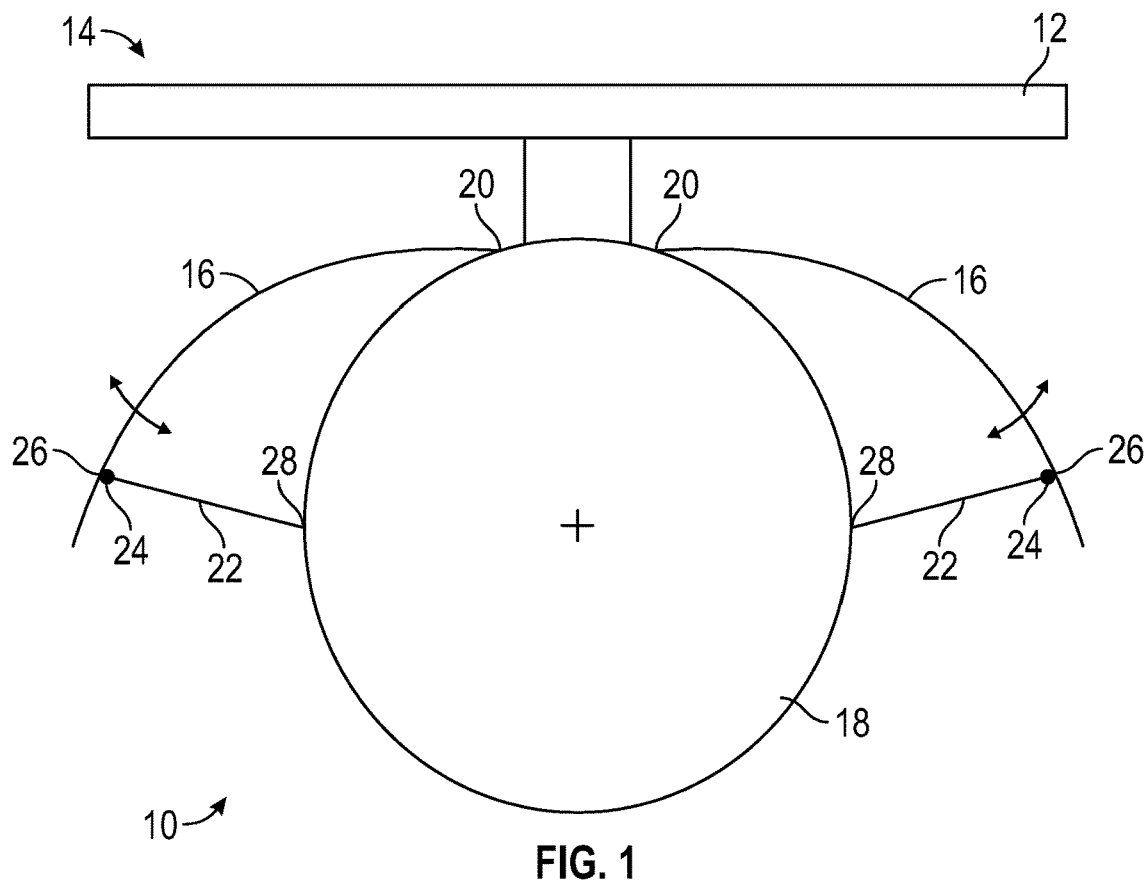
FIG. 1 is a schematic illustration of an aircraft engine and nacelle.

Referring now to FIG. 1, illustrated is an embodiment of an aircraft engine 10 mounted under a wing 12 of an aircraft 14. The engine 10 includes one or more segments of cowling 16 movable between an opened position such as illustrated and a closed position around an engine body 18. The cowling 16 is operably connected to a cowling hinge 20 about which the cowling 16 rotates to move between the opened position and the closed position. To aid in retaining the cowling 16 in the opened position, a hold open rod 22 is connected to each of the cowling 16 and the engine body 18 to prevent closing of the cowling 16 while the hold open rod 22 is deployed. In some embodiments, the hold open rod 22 is secured to the cowling 16 at a first rod end 24 via a rod hinge 26, and when the cowling 16 is in the opened position a second rod end 28 is moved to the engine body 18 and secured to the engine body 18 via, for example a locating pin or other apparatus recognizable to one skilled in the art.

Figure 2:
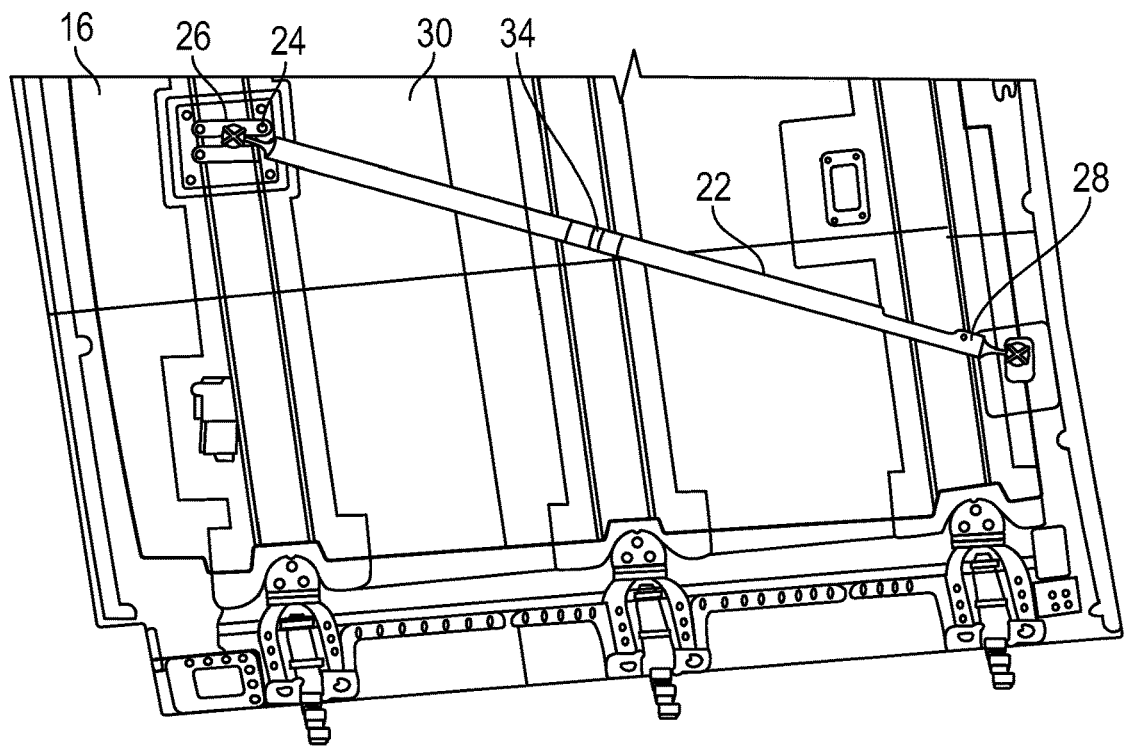
FIG. 2 is an illustration of an embodiment of a hold open rod in a stowed position.
Figure 3:
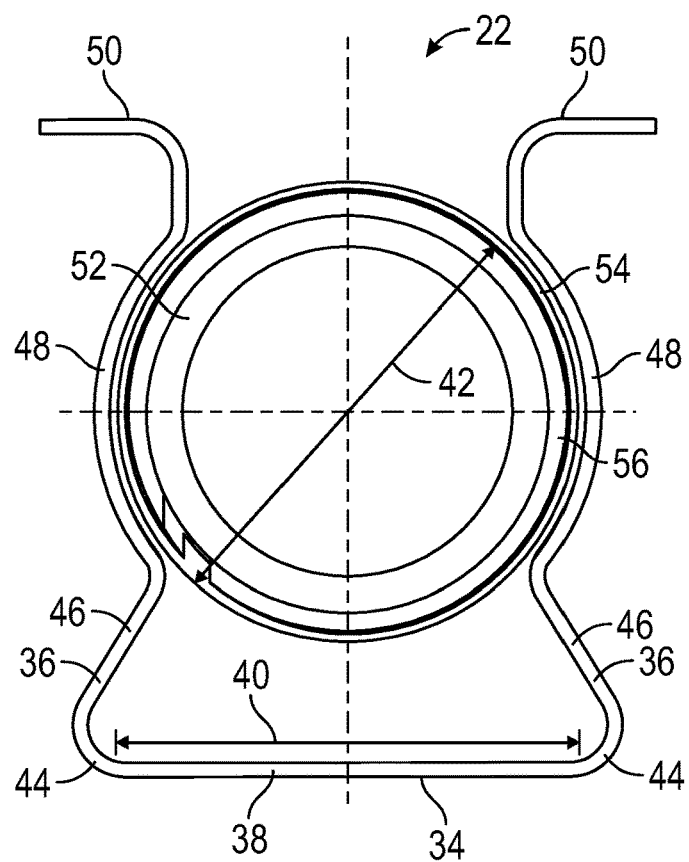
FIG. 3 is a cross-sectional view of an embodiment of a hold open rod and retaining apparatus.
Figure 4:
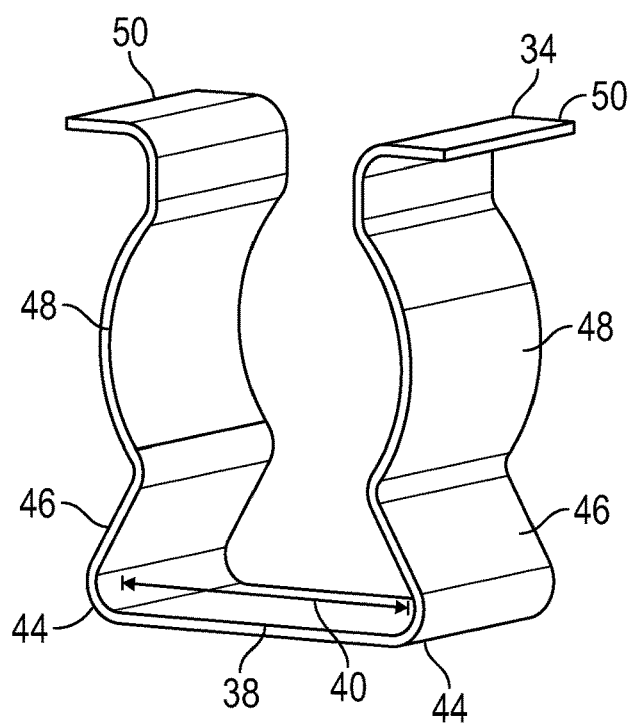
FIG. 4 is a perspective view of an embodiment of a spring clip to retain a hold open rod.

Referring now to FIG. 2, the hold open rod 22 is illustrated in a stowed position at an interior 30 of the cowling 16. When in the stowed position, the hold open rod 22 is secured to the cowling at the rod hinge 26, and further retained to the interior 30 of the cowling 16 at one or more locations along the hold open rod 22 axial length between the first rod end 24 and the second rod end 28. As shown in FIG. 3, in some embodiments the hold open rod 22 is secured to the interior 30 of the cowling 16 via a spring clip 34. The spring clip 34 includes two clip legs 36 extending from a clip base 38 located at the cowling 16. The clip legs 36 are shaped to retain the hold open rod 22 therebetween, as will be described with reference to FIG. 4. The clip base 38 has a base width 40, which in some embodiments is greater than a rod diameter 42 (shown in FIG. 3). The clip legs 36 extend from clip base 38 at base ends 44 along a straight portion 46 at an acute angle toward the hold open rod 22 such that a distance between the clip legs 36 decreases. The clip legs 36 each include an arcuate portion 48 extending from the straight portion 44, which is curvilinear in shape to receive the hold open rod 22. When the hold open rod 22 is positioned between the arcuate portions 48, the clip legs 36 exert a retain force acting toward the hold open rod 22 to retain the hold open rod 22 between the arcuate portions 48. Each of the clip legs 36 further includes a guide portion 50 extending from the arcuate portion 48 to increase the spacing between the clip legs 36, thus improving ease of insertion of the hold open rod 22 into the spring clip 34.

Referring again to FIG. 3, the hold open rod 22 includes a rod body 52 that is a hollow tubular structure that, in some embodiments is formed from a composite material. The composite material may, in some embodiments, be a carbon fiber reinforced polymer material. One skilled in the art will readily appreciate, however, that other composite materials may be utilized.

The hold open rod 22 further includes a localized wear-resistant sleeve 54 installed onto an exterior surface of the rod body 52 at locations along the hold open rod 22 where the clip legs 36 contact the hold open rod 22. The sleeve 54 is formed from, for example, a polyolefin material that is secured to the rod body by a shrink fit process by which heat is applied to the sleeve 54 material to shrink the sleeve 54 into a tight fit on the rod body 52. In addition to being wear-resistant, the sleeve 54 is configured to provide cushioning and/or damping during vibratory events.

Figure 5:
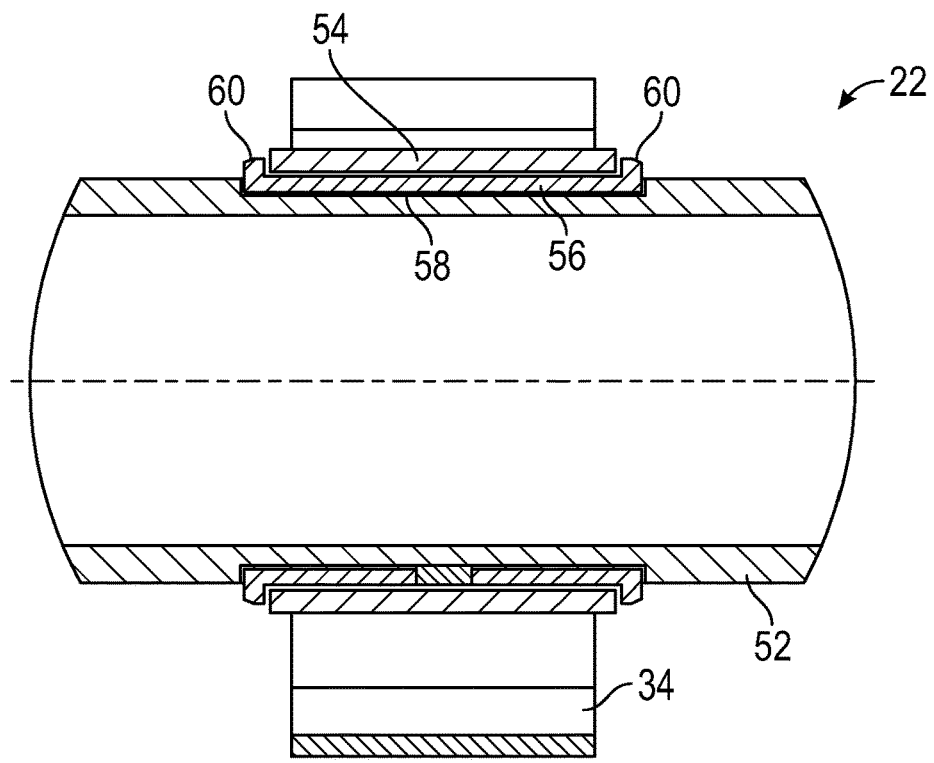
FIG. 5 is another cross-sectional view of an embodiment of a hold open rod and retaining apparatus.
Figure 6:
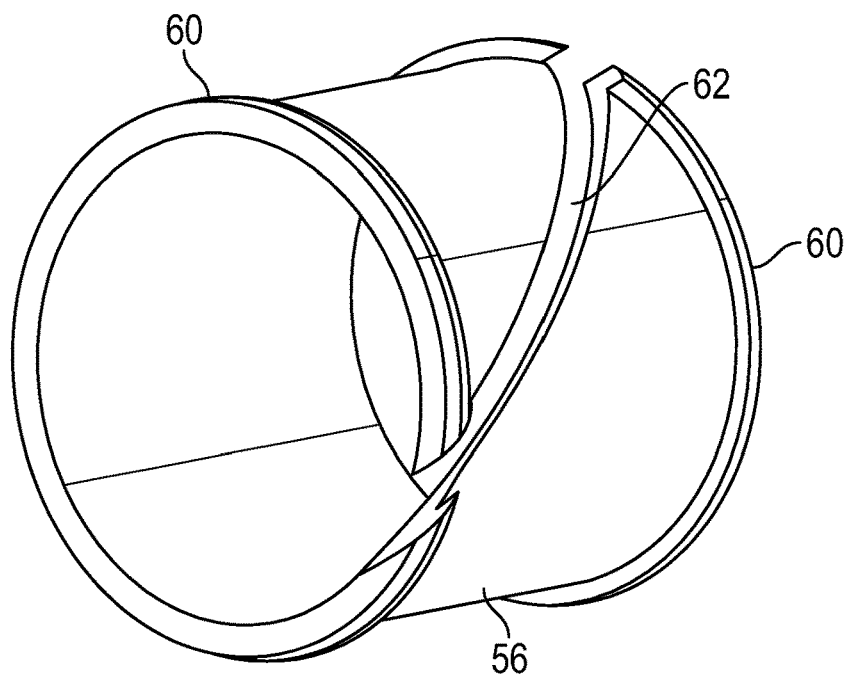
FIG. 6 is a perspective view of an embodiment of a bushing.

A bushing 56 is wrapped around the rod body 52 between the rod body 52 and the sleeve 54. The bushing 56 protects the rod body 52 from the heat utilized to shrink fit the sleeve 54 to the hold open rod 22. The bushing 56 is formed from a relatively high thermally resistant material, such as polyetheretherketone (PEEK). The bushing 56 material is selected to be tribologically compatible with the rod body 52 to protect the rod body 52 from wear during vibration. Referring to FIG. 5, in some embodiments the bushing 56 is positioned in a body notch 58 formed in the rod body 52. Further, in some embodiments the bushing 56 includes a bushing lip 60 at each axial end of the bushing 56. The bushing lip 60 is a radial protrusion to axially position and retain the sleeve 54 in a selected position along the rod body 52. Referring now to FIG. 6, the bushing 56 is constructed for installation onto the rod body 52. In some embodiments, the bushing 56 includes a bushing split 62. The bushing split 62 allows for expansion of the bushing 56 so the bushing 56 may be more easily installed onto the rod body 52. While the bushing 56 and the sleeve 54 are installed to the rod body 52, the bushing 56 and the sleeve 54 are rotatable about the rod body 52 to prevent localized damage to the rod body 52.

The disclosed apparatus provides retention of the hold open rod 22 in the spring clip 34, while preventing wear of the composite rod body 52 and thermal damage to the rod body 52 from the application of heat used to shrink fit the sleeve 54. Further, the combination of the bushing 56 and the sleeve 54 improves the configuration for wear and imparts damping during vibration to further reduce wear.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rod assembly comprising:
 a tubular rod body formed from a composite material;
 a localized sleeve installed to the rod body, the sleeve secured to the rod body by a shrink fit operation including the application of heat to the sleeve material;
 a bushing disposed radially between the rod body and the sleeve, the bushing configured to absorb thermal energy of the application of heat; and
 a body notch formed as a radially inward recess in the rod body in which the bushing is positioned.

2. The rod assembly of claim 1, further comprising a radially outwardly extending bushing lip formed in the bushing to position the sleeve material relative to the bushing.

3. The rod assembly of claim 1, further comprising a bushing split formed in the bushing to allow for installation of the bushing to the rod body.

4. The rod assembly of claim 1, wherein the sleeve is formed from a polyolefin material.

5. The rod assembly of claim 1, wherein the bushing is formed from a polyetheretherketone (PEEK) material.

6. A door and hold open rod assembly of an aircraft, comprising:
 the door; and
 a hold open rod assembly secured to the door, the hold open rod assembly configured to support the door in an opened position when the hold open rod is deployed, the hold open rod assembly, including:
  a tubular rod body formed from a composite material;
  a localized sleeve installed to the rod body, the sleeve secured to the rod body by a shrink fit operation including the application of heat to the sleeve material; and
  a bushing disposed radially between the rod body and the sleeve, the bushing configured to absorb thermal energy of the application of heat.

7. The assembly of claim 6, further comprising a spring clip secured to the door to retain the hold open rod in a stowed position, the spring clip configured to retain the hold open rod at the localized sleeve.

8. The assembly of claim 6, further comprising a rod hinge to retain the hold open rod to the door.

9. The assembly of claim 6, further comprising a body notch formed as a radially inward recess in the rod body in which the bushing is positioned.

10. The assembly of claim 6, further comprising a radially outwardly extending bushing lip formed in the bushing to position the sleeve material relative to the bushing.

11. The assembly of claim 6, further comprising a bushing split formed in the bushing to allow for installation of the bushing to the rod body.

12. The assembly of claim 6, wherein the sleeve is formed from a polyolefin material.

13. The assembly of claim 6, wherein the bushing is formed from a polyetheretherketone (PEEK) material.

14. The assembly of claim 6, wherein the door is a cowling of an engine assembly for the aircraft.

15. An engine assembly of an aircraft, comprising:
 an engine body;
 a cowling configured to at least partially enclose the engine body, the cowling movable between a closed position and an opened position; and
 a hold open rod assembly secured to the cowling, the hold open rod assembly configured to support the cowling in an opened position when the hold open rod is deployed, the hold open rod assembly, including:
  a tubular rod body formed from a composite material;
  a localized sleeve installed to the rod body, the sleeve secured to the rod body by a shrink fit operation including the application of heat to the sleeve material; and
  a bushing disposed radially between the rod body and the sleeve, the bushing configured to absorb thermal energy of the application of heat.

16. The engine assembly of claim 15, further comprising a spring clip secured to the cowling to retain the hold open rod in a stowed position, the spring clip configured to retain the hold open rod at the localized sleeve.

17. The engine assembly of claim 15, further comprising a body notch formed as a radially inward recess in the rod body in which the bushing is positioned.

18. The engine assembly of claim 15, further comprising a radially outwardly extending bushing lip formed in the bushing to position the sleeve material relative to the bushing.

19. The engine assembly of claim 15, further comprising a bushing split formed in the bushing to allow for installation of the bushing to the rod body.

* * * * *